May 6, 1958     D. H. HOWRY     2,833,999
TRANSDUCER
Filed Sept. 28, 1953

INVENTOR.
Douglass H. Howry
BY

ATTORNEY

United States Patent Office 2,833,999
Patented May 6, 1958

2,833,999

TRANSDUCER

Douglass H. Howry, Denver, Colo.

Application September 28, 1953, Serial No. 382,547

4 Claims. (Cl. 340—8)

My invention relates to apparatus employing ultrasonic energy for purposes such as the inspection of the interior structure of bodies of matter and particularly to an improved ultrasonic energy transducer for such apparatus.

Ultrasonic energy has been used effectively in the examination of solid objects to detect the presence of flaws, to measure dimensions, determine grain size and incipient fatigue, and has also been employed for the examination of living tissue.

It is an object of my invention to provide an improved transducer for projecting ultrasonic energy through liquid and solid media along straight narrow paths at high intensity.

Additional objects and advantages of my invention will become apparent as the following description proceeds and the features of novelty which characterize my invention will be pointed out with particularity in the claims annexed to and forming a part of this specification.

Briefly in carrying out the objects of my invention in one embodiment thereof an ultrasonic energy transducer is provided which includes an ultrasonic energy generating element such as a piezoelectric crystal and an energy-transmitting element comprising a block of material having a multitude of small hornlike projections formed on its surface and a closure or diaphragm bonded to the outer ends of the projections. The surface of the block may be dished to provide an energy-concentrating effect. This transducer, when operated within a predetermined range of ultrasonic frequencies, produces a highly concentrated beam of ultrasonic energy having a cross sectional area materially less than that of the transducer by which it is produced. This highly concentrated beam of ultrasonic energy, when employed, for example, in ultrasonic apparatus for the examination of living tissue, facilitates the production of pictorial representations of the interiors of objects under examination having a high degree of resolution and constituting accurate clinical information.

Figure 2:
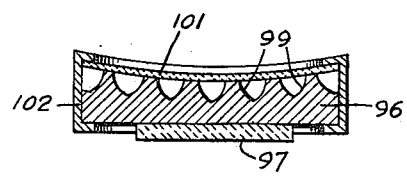
Figure 1:
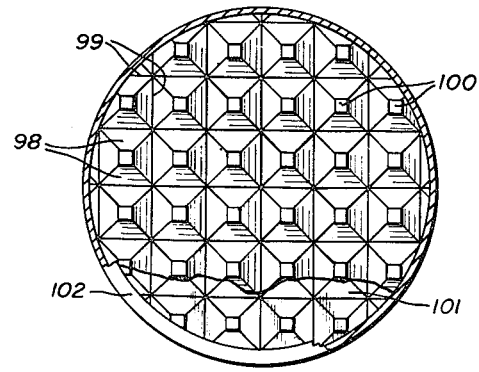

For a better understanding of my invention, reference may be had to the accompanying drawing in which:

Fig. 1 is a plan view, partly broken away, of an ultrasonic transducer embodying my invention; and Fig. 2 is a sectional elevation view of the transducer of Fig. 1.

Referring now to the drawing, the transducer illustrated in Figs. 1 and 2 comprises a disk 96 of aluminum or other suitable material having a disk-shaped piezoelectric element 97 mounted concentrically therewith on the lower side and bonded thereto by a suitable sound transmitting cement. The surface of the disk 96 is provided with a multitude of grooves comprising two sets of grooves at right angles to one another. For purposes of illustration the grooves have been indicated as of substantial size, however in the actual transducer they are small grooves which may be formed, for example, by a cutting edge of the order of size of a razor blade. The sets of grooves indicated at 98 and 99 form a plurality of inverted square exponential horn-shaped projections 100 so that sound energy passing from the transducer element 97 through the block 96 is concentrated at the peaks of these horns. The surface of the block 96 comprising the multitude of peaks 100 is machined in dished form to provide an energy condensing effect essentially similar to that which can be secured by means of condensing lenses or reflectors. A disk of thin glass or other suitable resilient material indicated at 101 is secured in engagement with the multitude of peaks 100 and is clamped and sealed in position about its edges by a sealing and clamping ring 102. The multitude of horn-like projections 100 acts as amplitude increasing elements and, when the crystal 97 is excited by ultrasonic frequency electric impulses, the ultrasonic energy passing from the crystal 97 through the block 96 to the diaphragm 101 is transmitted to the diaphragm with increased amplitudes and a more intense impulse of ultrasonic energy is projected efficiently into the liquid by virtue of the more effective mechanical impedance coupling obtained.

While I have described a particular embodiment of my invention, various other arrangements and embodiments will occur to those skilled in the art. I do not, therefore, desire that my invention be limited to the specific construction illustrated and described herein and I intend by the appended claims to cover all modifications which fall within the spirit and scope of my invention.

I claim:

1. An electroacoustical transducer for projecting ultrasonic energy through a body of liquid comprising a round, flat piezoelectric element having a pair of exciting electrodes, a block of sound-transmitting material having one face in engagement with a face of said element, the opposite face of said block having a network of grooves therein forming a multiplicity of projections each constituting an exponential horn and said opposite face of said block being dished to form a convex lens surface, a resilient dished diaphragm in engagement with said projections and acoustically bonded thereto, and a ring enclosing said block and clamping the periphery of said diaphragm thereby restricting the vibration thereof.

2. An electroacoustical transducer element for transmitting ultrasonic energy from a generator into a body of liquid comprising an ultrasonic energy generating element, a block of sound-transmitting material having an energy-receiving face and an energy-transmitting face, said transmitting face having a network of grooves therein forming a multiplicity of projections each constituting an exponential horn, and a resilient diaphragm in engagement with the outer ends of said projections and acoustically bonded thereto.

3. An electroacoustical transducer for projecting ultrasonic energy through a body of liquid comprising an ultrasonic energy generating element, a block of sound-transmitting material having one face in driving engagement with said element, the opposite face of said block having a network of grooves therein forcing a multiplicity of projections each constituting an exponential horn, a resilient diaphragm in engagement with the outer ends of said projections and acoustically bonded thereto, and means engaging the periphery of said diaphragm and enclosing the sides of said block.

4. An electroacoustical transducer for projecting ultrasonic energy through a body of liquid comprising an ultrasonic energy generating element, a block of sound transmitting material having one face in driving engagement with said element, the opposite face of said block having a network of grooves therein forming a multiplicity of projections each constituting an exponential horn and said opposite face of said block being dished to form a convex lens surface, a resilient dished diaphragm in engagement with said projections and acoustically bonded thereto, and means engaging the periphery of said diaphragm and enclosing the sides of said block.

References Cited in the file of this patent

UNITED STATES PATENTS

| | | |
|---|---|---|
| 2,164,125 | Sokoloff | June 27, 1939 |
| 2,323,030 | Gruetzmacher | June 29, 1943 |
| 2,420,676 | Peterson | May 20, 1947 |
| 2,448,352 | Carlin | Aug. 31, 1948 |
| 2,477,246 | Gillespie | July 26, 1949 |
| 2,528,727 | Rines | Nov. 7, 1950 |
| 2,593,865 | Erdman | Apr. 22, 1952 |

FOREIGN PATENTS

| | | |
|---|---|---|
| 470,583 | Canada | Jan. 2, 1951 |
| 48,400 | Netherlands | May 15, 1940 |
| 696,920 | Great Britain | Sept. 9, 1953 |
| 1,017,869 | France | Dec. 19, 1952 |